US009439239B2

(12) United States Patent
Jennings et al.

(10) Patent No.: US 9,439,239 B2
(45) Date of Patent: Sep. 6, 2016

(54) SELECTIVE TRANSMISSION STORAGE AND PLAYBACK FOR COMMUNICATION DEVICE

(71) Applicant: William H. Jennings, Huddleston, VA (US)

(72) Inventors: William H. Jennings, Huddleston, VA (US); Gerald Cooper, Java, VA (US)

(73) Assignee: William H. Jennings, Huddleston, VA (US)

(*) Notice: Subject to any disclaimer, the term of this patent is extended or adjusted under 35 U.S.C. 154(b) by 155 days.

(21) Appl. No.: 14/169,880

(22) Filed: Jan. 31, 2014

(65) Prior Publication Data

US 2015/0111491 A1   Apr. 23, 2015

Related U.S. Application Data

(60) Provisional application No. 61/961,719, filed on Oct. 22, 2013, provisional application No. 61/963,550, filed on Dec. 9, 2013.

(51) Int. Cl.
| | |
|---|---|
| *H04W 88/02* | (2009.01) |
| *H04W 4/10* | (2009.01) |
| *H04H 60/27* | (2008.01) |
| *H04H 60/37* | (2008.01) |

(52) U.S. Cl.
CPC ........... *H04W 88/023* (2013.01); *H04H 60/27* (2013.01); *H04W 4/10* (2013.01); *H04H 60/37* (2013.01)

(58) Field of Classification Search
None
See application file for complete search history.

(56) References Cited

U.S. PATENT DOCUMENTS

| | | | |
|---|---|---|---|
| 5,371,551 A | 12/1994 | Logan et al. | |
| 6,028,752 A | 2/2000 | Chomette et al. | |
| 6,895,165 B2 | 5/2005 | Boys | |
| 7,102,965 B1 | 9/2006 | Hagan, Jr. | |
| 7,305,075 B2 | 12/2007 | Harris | |
| 8,060,637 B2 | 11/2011 | Kayanuma et al. | |
| 2007/0054702 A1* | 3/2007 | Rokusek et al. | 455/563 |
| 2007/0111754 A1* | 5/2007 | Marshall et al. | 455/556.1 |
| 2009/0276214 A1* | 11/2009 | Chong et al. | 704/235 |
| 2011/0161006 A1 | 6/2011 | Deurwaarder | |
| 2013/0150115 A1* | 6/2013 | Maggenti et al. | 455/518 |

* cited by examiner

*Primary Examiner* — Philip Sobutka
(74) *Attorney, Agent, or Firm* — Bacon & Thomas, PLLC

(57) ABSTRACT

A transmission playback device for selectively storing discrete transmission data is configured for use with a telecommunications accessory device. The playback device includes a memory assembly having a pair of identical storage buffers. A first storage buffer has memory designated for continuously recording transmission data, and a second storage buffer has memory designated for selectively storing a discrete message from the transmission data. A controller exchanges the designations of each storage buffer upon a request by a user such that the second storage buffer becomes designated for continuously recording transmission data and the first storage buffer becomes designated for selectively storing a discrete message from the transmission data.

5 Claims, 2 Drawing Sheets

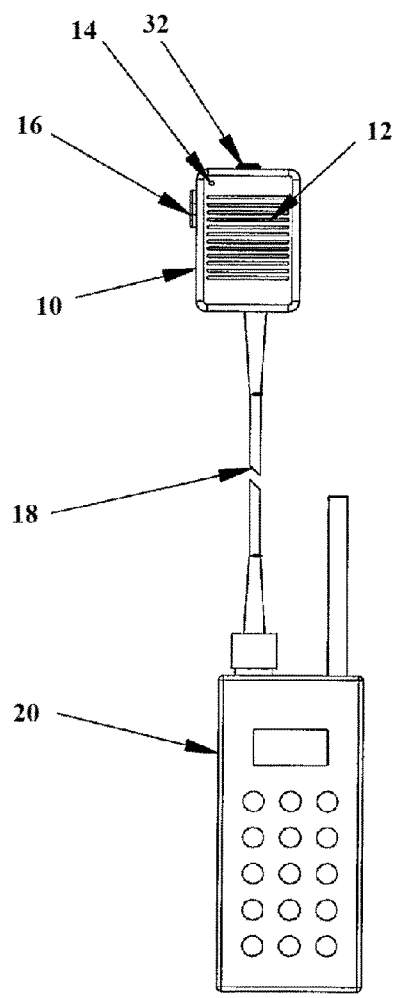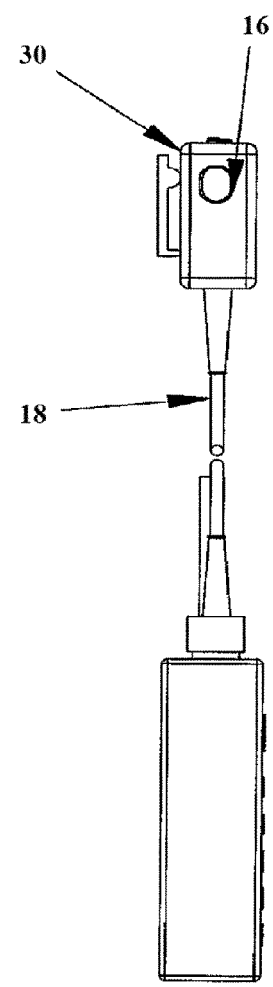
FIG. 1  FIG. 2
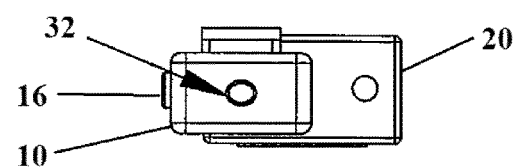
FIG. 3

SELECTIVE TRANSMISSION STORAGE AND PLAYBACK FOR COMMUNICATION DEVICE

FIELD OF THE INVENTION

The present invention relates to a communication apparatus having a recording feature and a playback feature for selectively playing back stored transmission data. In particular, the present invention allows a user to record, store and play back discrete received audio transmissions.

BACKGROUND

Communication devices, such as radio accessories that receive (RX) and transmit (TX) audio, are commonly used in business, military, public safety, industrial, commercial, SWAT and personal applications, among others. These communication devices are often used in loud, stressful and unsafe environments. As a result, it can be difficult for a user to hear and/or understand an incoming audio transmission. With most conventional communication devices, if the user does not hear or understand a recent audio transmission received from a sender, then the user must call back the sender to ask him or her to repeat the previous transmission. A user might have to call the sender back multiple times if it is too difficult to hear a particular received audio transmission. This is undesirable from a number of standpoints. For example, each new audio transmission by the user to and from the sender during an emergency situation wastes valuable time that could be better spent dealing with the present emergency. During such an emergency, the ability to act and respond to certain situations in a quick or timely manner is of great importance.

The need for a user to call back the sender can delay the user from acting upon important information contained in the first transmission since the user must wait for the sender to re-transmit the previous message. An increase in repeat transmissions can disadvantageously tie up available communication channels and/or bandwidth. Moreover, each additional transmission drains power from the communication device's battery, and thus wastes the battery's energy. It is also not safe to divert the user's attention by requiring him or her to call back a previous sender during a potentially critical and/or dangerous situation since making such a call creates an unneeded distraction.

Certain devices exist which allow a user to record and playback AM/FM/satellite radio and television presentations for entertainment purposes. For example, these devices allow a user to listen to or watch a missed portion of the entertainment in a convenient manner. The user may further be able to choose how much of the missed entertainment that he or she desires to listen to or watch. This is typically accomplished by means of automatically recording an incoming data stream in a circular manner. After a fixed time period of sequential recording, the recording apparatus will continue to record by overwriting the already recorded material in the same order that it was originally recorded, such that the oldest data is overwritten first. For example, in an AM/FM/satellite radio or television apparatus, a recorded version of the last couple minutes of the presentation will be available for a user to access.

However, such a recording and playback process does not provide the user with the ability to selectively save discrete data. Instead, these conventional recording and playback devices continuously record received audio/video in a manner such that the user has no control over which portion of the received audio/video he or she desires to store for future playback. This inability to choose what discrete data should be stored for future playback results in the user wasting valuable time since he or she needs to search for it. The selection of playback data is made more difficult by the continuous circular recording since it can eventually result in overwriting the portion of audio/video that is desired to be saved once all the available memory is used up. Moreover, incorporating such a conventional recording and playback feature into a communications device would be problematic since incoming transmissions can be received intermittently. As a result, it would be difficult for a user to differentiate each transmission if they are all saved as a continuous data stream. It is thus apparent from the foregoing that there is a clear need for a communications apparatus that allows a user to selectively store a discrete message, or a portion of received audio, while continuing to capture incoming audio, which the user can selectively store in place of the previously selected/stored audio, as is provided by the present invention.

SUMMARY

The present invention provides a transmission playback device that allows a user to record, store and play back discrete received audio transmissions, such as "receive" (RX) audio. Such a transmission playback device is beneficial for use in high noise, critical operating conditions, since it significantly decreases dispatcher work load and radio traffic, thereby allowing a user to focus their attention on the present situation. As a result, the ability to communicate with optimum efficiency and confidence is possible. Accordingly, the transmission playback device is ideal for police officers, fire fighters, emergency medical technicians, military personnel, as well as construction workers, among others.

The received transmission is saved to memory in a circular queue according to a first-in first-out basis, such that once the memory reaches full capacity, the oldest saved data is overwritten in order to allow the most recent transmission data to always be available for playback. If a new transmission is received while the transmission playback device is engaged in its playback mode, the device will automatically switch from the playback mode to the receive mode so that recording any incoming data will override the playback function.

In addition to playing back the previous transmission, the transmission playback device also allows the user to record and selectively store discrete messages which can then be replayed later. The transmission playback device includes a memory assembly having a pair of identical storage buffers for selectively saving discrete messages of the transmission. A first buffer is designated as a protected buffer, and the other buffer is designated as a scratchpad buffer. These roles are swapped when a new message is saved, but the data stored in the buffers remain in their original location. For example, the first buffer serves as a scratchpad memory into which a future transmission is to be stored, while the second buffer serves as a protected storage area for saving a portion of transmission data selected by the user.

When a new message is heard that a user deems more important to preserve than the message already in the protected storage buffer, the roles of the buffers are swapped.

A controller begins storing the transmission data into the scratchpad buffer when a transmission begins, and any previous contents of the scratchpad buffer are discarded. The transmission data is continuously recorded until the buffer is full or the transmission ends, whichever occurs first. The controller plays back any stored transmission in the protected buffer when prompted by the user. This playback continues until the contents of the buffer have been played or another transmission begins. If such a transmission is initiated, the controller automatically terminates playback to avoid interference with the transmission.

The controller designates the scratchpad buffer as the protected buffer if the user decides that the most recent transmission should be saved. This can be accomplished even if the transmission is still active. Further, the controller designates the previous protected buffer as the new scratchpad buffer. Accordingly, the role of each buffer is exchanged, and the data stored therein is not physically transferred between buffers. In other words, the functions of each buffer are reassigned such that the buffer that previously held the protected message is now designated as the scratchpad buffer, and its contents will be overwritten when the next call is received. Also, the buffer that previously held the scratchpad memory, and which therefore holds the most recent call, is then designated as the protected buffer.

It is therefore an aspect of the present application to provide a transmission playback device for selectively storing discrete transmission data and configured for use with a telecommunications accessory device, comprising a memory assembly including a first storage buffer and a second storage buffer, wherein the first and second storage buffers are identical; the first storage buffer having memory designated for continuously recording transmission data; the second storage buffer having memory designated for selectively storing a discrete portion of the transmission data; and a controller for exchanging the designations of each storage buffer upon a request by a user and playing back the stored transmission data, wherein when the first storage buffer is designated for continuously recording transmission data, and the second storage buffer is designated for selectively storing a discrete portion of the transmission data, the controller causes the first buffer to be designated for selectively storing a discrete portion of the transmission data and the second buffer to be designated for continuously recording transmission data upon receipt of said user request.

This transmission playback device is adapted to connect to the telecommunications accessory device, and can further include actuation means, such as an actuation button integrally molded thereto, for operating the controller. It should be appreciated that a length of the discrete transmission may be a function of a length of time that the actuation button is depressed, or the number of times the button is depressed. The transmission playback device may be further configured to turn off automatically in the absence of a transmission and turn on automatically in the presence of a transmission.

In another aspect of the present application, a protected memory device is provided which comprises a protected memory, a user input, and a connection to the protected memory device, wherein the protected memory device is adapted to be retrofitted onto a transmission playback device via said connection and to receive audio transmission data from the transmission playback device, wherein, when the protected memory device is connected to the transmission playback device, the user input enables a user to select a portion of the audio transmission data, and wherein the protected memory stores the discrete transmission data selected by the user; and wherein the protected memory device is further adapted to play back the stored transmission data at the request of the user.

A further aspect of the present application provides a playback device for recording, storing and playing back a transmission, comprising a scratchpad buffer that receives transmission data and records said transmission data in a continuous loop, wherein the received transmission data is stored in the scratchpad buffer until the scratchpad buffer is full or the transmission ends, whichever occurs first; a protected buffer that saves a discrete message selected by a user from the transmission data; and a controller for selecting the discrete message, wherein the controller initiates playback of the discrete message stored in the protected buffer. It should be appreciated that the playback device may further include data compression means as well as transmission signal amplification means for improving the signal of the transmission. Display means may also be provided with the playback device for communicating information associated with the discrete message.

BRIEF DESCRIPTION OF THE DRAWINGS

The numerous other advantages, features and functions of embodiments of a transmission playback device will become readily apparent and better understood in view of the following description and accompanying drawings. The following description is not intended to limit the scope of the transmission playback device, but instead merely provides exemplary embodiments for ease of understanding.

FIG. 1 is a front elevation view of a transmission playback device of the present invention.

FIG. 2 is a side elevation view of the transmission playback device of FIG. 1.

FIG. 3 is a top plan view of the transmission playback device of FIG. 1.

Figure 4:
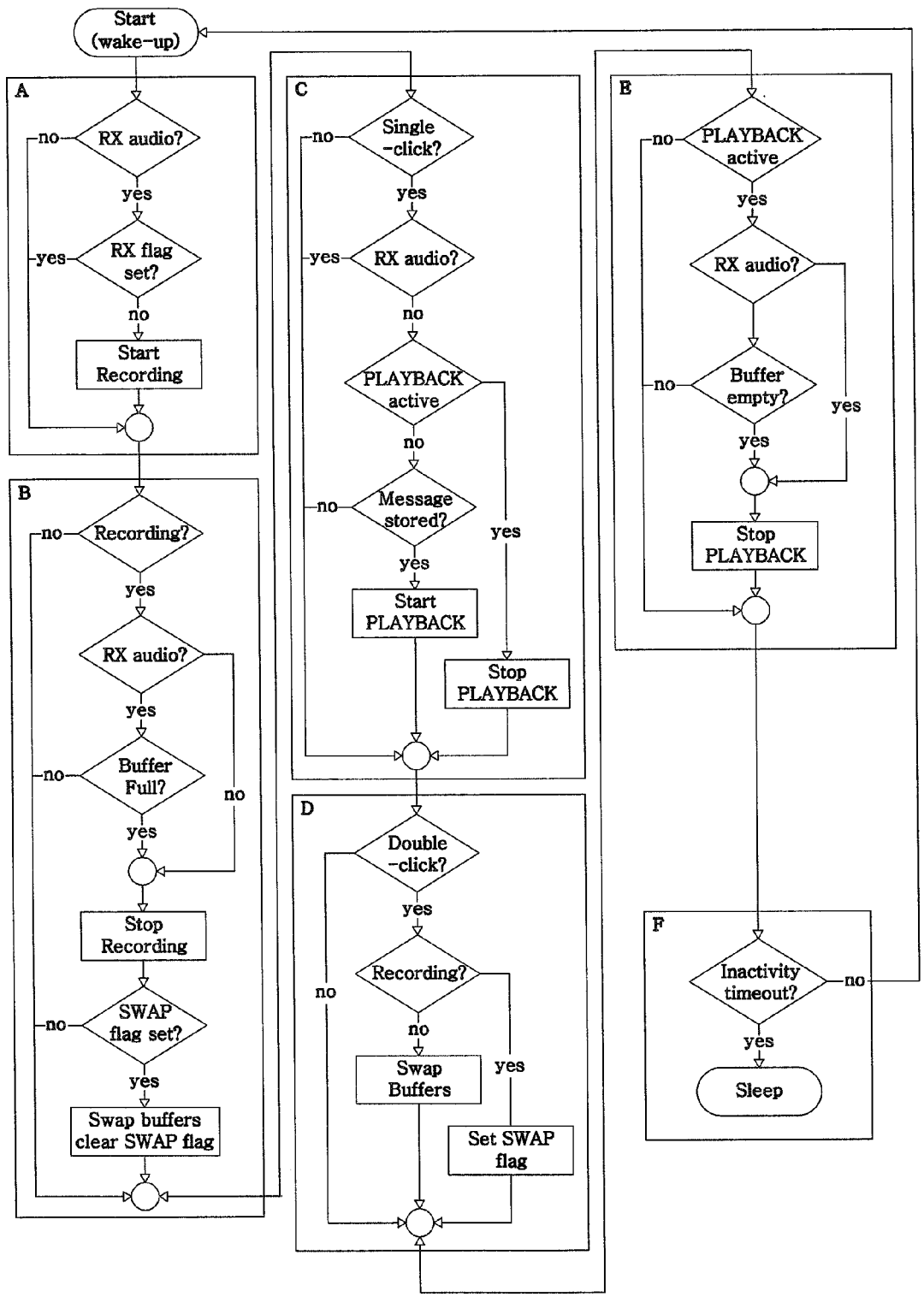
FIG. 4 illustrates an overview of the selective saving of receive audio by the transmission playback device of the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary configurations of a transmission playback device, and in no way limit the structures or configurations thereof according to the present disclosure.

DETAILED DESCRIPTION

A better understanding of various embodiments of the invention may be had from the following description read in conjunction with the accompanying drawings. While the disclosure is susceptible to various modifications and alternative constructions, certain illustrative embodiments are shown in the drawings and are described below in detail. It should be understood, however, that there is no intention to limit the disclosure to the specific embodiments disclosed, but on the contrary, the intention is to cover all modifications, alternative constructions, combinations, and equivalents falling within the spirit and scope of the disclosure.

Referring to FIGS. 1-3, a telecommunication accessory device 10, such as a speaker microphone, includes a transmission playback device 30 that allows a user to record, store and play back discrete receive audio transmissions. The speaker microphone 10 comprises a speaker grill 12, a microphone opening 14, and a push-to-talk (PTT) button 16. Further, the speaker microphone 10 can be connected to a radio 20 via an electrical cable 18. The inclusion of the transmission playback device 30 in an accessory device such as the speaker microphone 10 has many advantages. For example, a user can wear the speaker microphone 10 on a lapel so that it is easily accessible as the direct means of transmitting and receiving audio communication. In addition to the speaker microphone 10, it should be appreciated that the transmission playback device 30 may be incorporated into any telecommunication device that supports receive (RX) audio, such as land mobile portable radios, land mobile mobile radios, GMRS radios, FRS radios, LTE radios, P25 radios, mobile phones, mesh network radio, Wi-Fi based communications devices, PIT cellular phones, dispatch systems, repeaters, or any other communication device utilizing at least receive audio and/or data transfer. Moreover, existing telecommunications accessory devices and radios can be retrofitted by integrating the transmission playback device 30 thereto in order to improve older devices by giving them new functionality.

As shown in FIGS. 1-3, the speaker microphone 10 is a self-contained system that contains all the necessary circuitry of the transmission playback device 30. The speaker microphone 10 may include its own battery for powering the transmission playback device 30, or it may draw power from the attached radio 20. For example, the speaker microphone may draw power from a radio that does not normally provide such power by incorporating discrete circuitry which causes the radio to provide this power.

The transmission playback device 30 stores the last received transmission, such as the received audio, into a memory chip as data. The amount of data stored depends on the capacity of the electronic component design. The user can play back this received transmission by activating an actuation button 32, such as an electro-mechanical switch or other input device on the accessory device. Other activation means may include VOX, remote actuation devices such as Bluetooth, magnetic inductance, and other wired or wireless input means. For example, an integrally molded button on the speaker microphone case, or any button geometry incorporated into the case, can interface to a momentary switch included in the circuitry. Pressing this button in a manner that will later be explained in further detail provides a plurality of playback options. Additionally, the actuation button 32 may be utilized for other functions, such as an emergency/man-down button, volume control button, and an LED on/off switch, among others. This can be accomplished by including certain software programming that involves the duration of contact with the button, number of contacts, and/or sequence of contacts, etc.

The transmission playback device 30 can include circuitry to utilize the same speaker as that used for normal incoming receive audio, i.e. the speaker of the speaker microphone 10. Alternatively, the transmission playback device 30 may further include a separate speaker for playing back the stored audio. The speaker microphone 10 may include an amplifier to boost the audio sound pressure level (SPL) so it can be clearly heard in loud environments. Such an amplifier and/or other associated features of the circuitry may be powered by the speaker microphone's battery, a separate dedicated battery, and/or a battery incorporated into a mating system. The circuitry of the transmission playback device 30 can detect periods of silence and shut the transmission playback device 30 down in response thereto in order to conserve battery life. When an incoming call is received, the transmission playback device can instantly wake up to draw power and record the received audio data.

In the event that the user is utilizing the playback mode of the transmission playback device 30 and a new call is received, the device will automatically switch from the playback mode to the receive audio mode. In other words, the incoming audio will override the playback function. This incoming call override of the playback function can be incorporated so that incoming receive audio takes precedence and terminates the playback action, thus allowing the incoming receive audio to be heard through the speaker of the accessory device.

The transmission playback device 30 further allows a user to replay previous audio transmissions that were received prior to the most recent transmission. In other words, various levels of the previous transmissions can be replayed. A user can easily select, via multiple depressions of the actuation button 32, which portion of the received audio transmission to play back. For example, if the user does not hear or understand a received audio transmission, then the user can depress the actuation button once to play back a portion of the transmission representing a pre-determined length of time, such as the previous eight seconds of received audio. By pressing the actuation button 32 twice, the user can play back a longer portion of the transmission, such as a length of time that is twice as long as that represented by a single button depression, or in other words the last sixteen seconds of received audio. Similarly, pressing the button three times allows the user to play back a still longer portion of the transmission, such as the last twenty-four seconds of received audio, and so on.

The received audio transmission is saved to memory in a circular queue according to a first-in first-out basis. Once the memory has reached full capacity, the oldest saved audio data is overwritten in order to allow the most recent received audio transmission to always be available. In a variation of the playback feature, by maintaining a single circular queue of receive audio data, the playback length of the stored receive audio transmission can be a function of length of time that the actuation button is depressed.

The transmission playback device 30 can also include various types of data compression technology in order to increase the amount of data that can be stored. Furthermore, either a separate additional memory storage system or a data storage system that is sufficiently large to record/store at least a full day, or several days, of receive audio data may be included with the transmission playback device 30. The data storage system can further record/store user transmitted (TX) audio. In addition to received audio, other types of transmitted data may be stored. In particular, the transmission playback device can record, store and playback digital data, analog data, transmit audio and video, receive audio and video, video and tracking information, and ambient audio, among others.

It should be appreciated that either RAM memory or flash memory may be utilized for the memory of transmission playback device 30. Flash memory, in particular, allows for a higher capacity than the RAM memory, and thus would allow a user to record longer duration incoming radio transmissions as opposed to radio transmissions of limited duration. This allows for the recording of surrounding dialogue and other sounds that are not just what is being received by the radio, i.e. active real-time non-radio transmission speech. Moreover, various types of companding, digital signal processing (DSP), and other related technologies can be incorporated in the transmission playback device 30 to enhance the audio quality for the listener.

In addition to playing back the last received audio transmission, another implementation of the transmission playback device 30 allows the user to record and selectively save discrete messages, such as those from a received audio transmission. The user can then later replay the saved message. The transmission playback device 30 can further display or communicate pertinent information associated with the stored message, such as the identity of the caller, when the call was made, the location of the person making the call, as well as biometric information of the person making the call, among others. Volatile memory may be used that would reset each time the device is powered off. Alternatively, non-volatile memory may be used to indefinitely store the received data for future access. Either type of memory may also include means of downloading and archiving the stored data.

In this implementation of the transmission playback device 30, a memory assembly having a pair of identical storage buffers, i.e. a first buffer and a second buffer, is included for recording and selectively saving discrete messages of the receive audio. At any time during operation of the transmission playback device 30, one of the buffers is designated as a protected buffer, and the other buffer is designated as a scratchpad buffer. These roles are exchanged when a new message is saved, but the contents of the buffers do not move. For example, the first buffer may serve as a scratchpad memory into which the next received transmission is to be stored, while the second buffer serves as a protected storage area for a selected message. When a new message is heard that a user deems more important to preserve than the message already in the protected storage buffer, the buffers are swapped.

In other words, when a new call begins, a controller, such as a microcontroller, begins storing the receive audio into the scratchpad buffer and any previous contents of the scratchpad buffer are discarded. The receive audio is continuously stored until the buffer is full or the call ends, whichever occurs first. When playback is initiated, the controller plays back any audio stored in the protected buffer. It should be appreciated that a user can invoke playback before ever storing a message. The playback continues until the contents of the buffer have been played or an incoming call begins. In the event that an incoming call is received, the controller automatically and immediately terminates playback to avoid interference with the incoming call. If the user decides that the most recent call is to be saved and the call is still ongoing, then once the call is complete or the buffer is full, the controller designates the scratchpad buffer as the protected buffer.

Additionally, the controller designates the other buffer that was previously the protected buffer as the new scratchpad buffer. Hence, the stored audio is not transferred between buffers. Instead, the buffers' roles are swapped and the data does not physically move between buffers. In this sense, the functions of the buffers are reassigned such that the buffer that previously held the protected message is now designated as the scratchpad buffer, and its contents will be overwritten when the next call is received. It follows that the buffer that previously held the scratchpad memory, and which therefore holds the most recent call, is now designated as the protected buffer.

Referring now to FIG. 4, a flowchart is shown depicting the operation of the transmission playback device. This flowchart illustrates an overview of the functionality of the device, including the selective saving feature previously described. For the sake of clarity, other applications of the transmission playback device, such as initialization and error-handling, are not depicted in this flowchart. Section A tests for the presence of incoming RX audio from a transceiver. If audio is detected, recording commences and a flag is set to indicate that RX audio is present. Section B tests whether to continue recording the RX audio by determining when the recording ends. When the incoming RX audio signal terminates, or the recording buffer becomes completely filled, the recording process is stopped. Also, when the recording is terminated, this section tests whether the user previously signaled an intent to store the call. If so, the scratchpad and protected buffers are swapped as indicated via the SWAP flag. As previously described, this process of storing a recorded message into protected memory involves changing the status of the two storage buffers. The buffer previously assigned the role of scratchpad recording is reassigned the role of storing protected audio. Moreover, the buffer previously assigned the role of holding protected recordings is reassigned the role of holding the scratchpad recordings. Thus, the scratchpad recordings are only temporary.

Section C of the flowchart in FIG. 4 tests for and services single activations of the actuation button 32, which start and stop message playback. If the single activation occurs while audio is being received, then the single activation is ignored. If no call is being received, and if a call is stored in the protected buffer, then playback is initiated. If, however, playback is already underway, then the single-click of the actuation button 32 terminates the playback session.

Section D covers how double activations of the actuation button 32 are handled. For example, this section tests for and services double activations of the actuation button 32, which signal the user's intent to make the last-received message protected. If no RX call is underway, then the buffer assignments are swapped immediately. If, however, an RX call is already underway, then the SWAP flag is set true. This causes each buffer to exchange roles, and occurs once the current RX call ends. Section E covers service of the playback task. For example, this section determines when to end a playback session. Since the transmission playback device always gives priority to RX calls, playback is terminated when incoming audio is detected or when the playback session reaches the end of the protected message.

Section F determines when the transmission playback device 30 should return to sleep mode. The transmission playback device 30 relies on low-current sleep mode operation to minimize current consumption. This section evaluates whether there is sufficient signal or user activity to remain awake or return to sleep mode. It should be appreciated that various timers and evaluations are used to make this decision to return to sleep mode or remain active.

Since the transmission playback device has been disclosed in the context of certain exemplary embodiments, it therefore will be understood by those skilled in the art that the present invention extends beyond the specifically disclosed embodiments to other alternative embodiments, combinations of embodiments, and/or uses of the invention and modifications and equivalents thereof. Thus, it is intended that the scope of the present invention herein disclosed should not be limited by the particular disclosed embodiments described above.

What is claimed is:

1. A transmission playback device for selectively storing discrete transmission data and configured for use with a telecommunications accessory device, comprising:
   a memory assembly including a first storage buffer and a second storage buffer, wherein the first and second storage buffers are identical;
   the first storage buffer having memory designated for continuously recording transmission data;
   the second storage buffer having memory designated for selectively storing a discrete portion of the transmission data;
   a controller operated by actuation means including an actuation button for exchanging the designations of each storage buffer upon a request by a user and playing back the stored transmission data, wherein when the first storage buffer is designated for continuously recording transmission data, and the second storage buffer is designated for selectively storing a discrete portion of the transmission data, the controller causes the first buffer to be designated for selectively storing a discrete portion of the transmission data and the second buffer to be designated for continuously recording transmission data upon receipt of said user request.

2. The transmission playback device of claim 1, wherein the transmission playback device is adapted to connect to the telecommunications accessory device.

3. The transmission playback device of claim 1, wherein the actuation button is integrally molded on the accessory device.

4. The transmission playback device of claim 1, wherein a length of the discrete transmission is a function of a length of time that the actuation button is depressed.

5. The transmission playback device of claim 1, wherein operation of the actuation button causes said playing back of the stored transmission data in the absence of a transmission, and wherein said playing back is terminated automatically and further operation of the actuation button is ignored in the presence of a transmission.

* * * * *